United States Patent [19]

Tenberg et al.

[11] 4,413,810
[45] Nov. 8, 1983

[54] ASCERTAINING THE LEVEL OF THE SLAG-LIQUID-METAL INTERFACE IN METALLURGICAL VESSELS

[75] Inventors: Werner Tenberg, Ratingen; Ludwig Pichert, Duisburg, both of Fed. Rep. of Germany

[73] Assignee: Mannesmann Aktiengesellschaft, Dusseldorf, Fed. Rep. of Germany

[21] Appl. No.: 408,510

[22] Filed: Aug. 16, 1982

[30] Foreign Application Priority Data

Aug. 19, 1981 [DE] Fed. Rep. of Germany ....... 3133182

[51] Int. Cl.³ .............................................. C21C 5/30
[52] U.S. Cl. ................................. 266/94; 73/304 R; 266/99
[58] Field of Search ..................... 266/94, 90, 99, 95, 266/96, 97, 205; 73/304 R, 290 R, 304 C; 222/590.64; 164/156; 432/45

[56] References Cited

U.S. PATENT DOCUMENTS 3,395,908 8/1968 Woodcock ............................ 266/94

FOREIGN PATENT DOCUMENTS 234127 6/1964 Austria .
1958224 5/1971 Fed. Rep. of Germany .... 73/304 R
1559912 2/1969 France .
673859 7/1979 U.S.S.R. ................................ 266/94

Primary Examiner—L. Dewayne Rutledge
Assistant Examiner—S. Kastler
Attorney, Agent, or Firm—Ralf H. Siegemund

[57] ABSTRACT

A two electrode probe is lowered into a vessel and the electrodes are electrically interconnected by liquid steel; the resistance condition then existing is ascertained as reference value against which subsequent resistance measurements are referenced as the probe is lifted from the vessel. The traversal of the slag-liquid metal interface causes a relative resistance change permitting selection of a threshold level that is independent from other measuring and operating parameters. The threshold device operates a counter in that for example forward and reverse counting tracks the lowering and lifting of the probe, but counting is halted when the interface level is reached, the count state then indicating the spacing of a zero level of the probe position from the level in which the threshold was exceeded in a particular direction.

3 Claims, 1 Drawing Figure

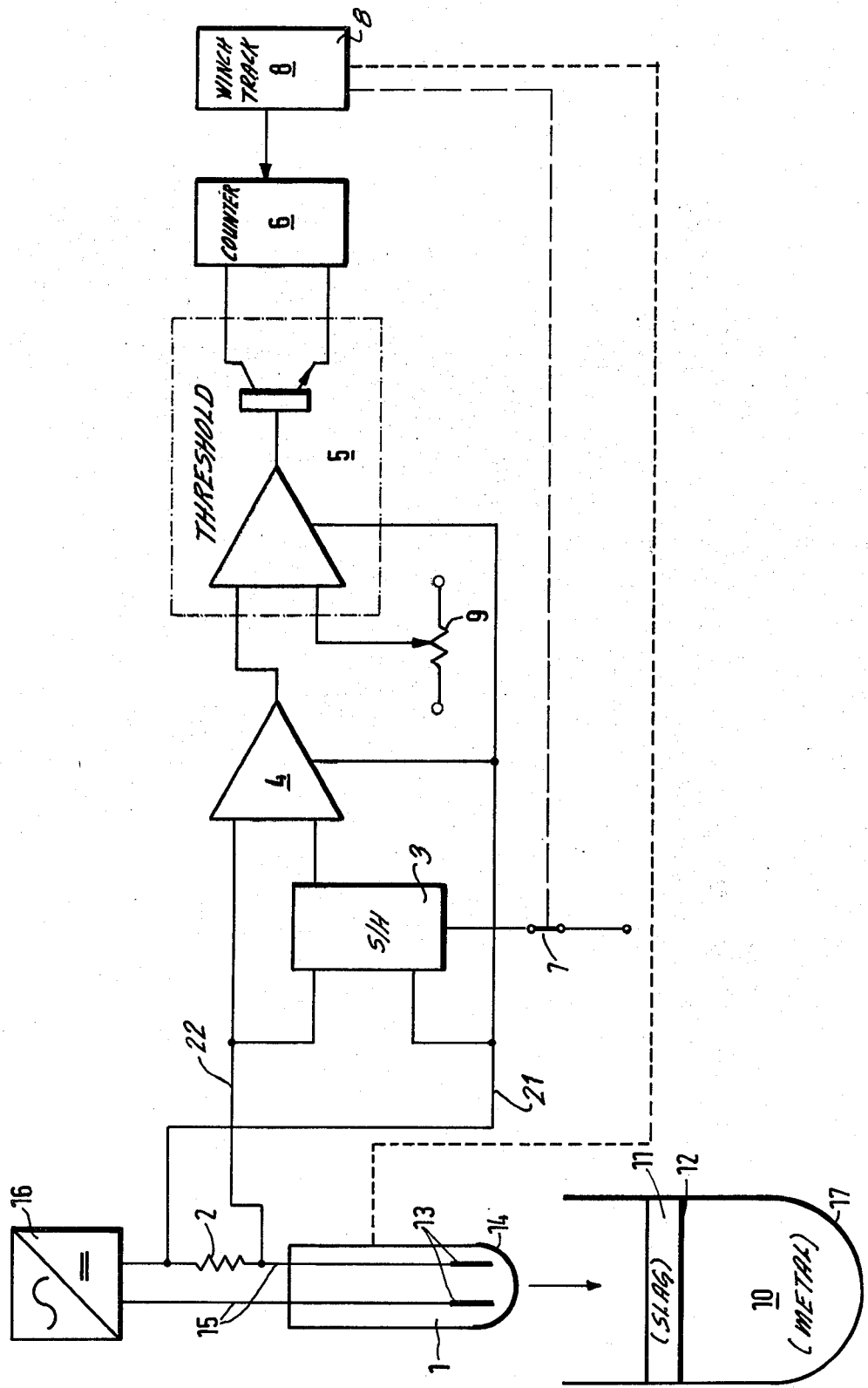

ASCERTAINING THE LEVEL OF THE SLAG-LIQUID-METAL INTERFACE IN METALLURGICAL VESSELS

BACKGROUND OF THE INVENTION

The present invention relates to ascertaining the surface level of a metal bath in a metallurgical vessel, for example, of the type used for steel making e.g. a converter.

The steel bath in a metallurgical vessel is usually covered with a layer of slag the layer being possibly of variable thickness. In cases it is necessary to ascertain the precise level of the liquid steel i.e. of the steel-slag-interface. In order to ascertain that interface or liquid bath level, it is known to utilize the difference in electric conductivity of steel and slag; the electric conductivity exhibits a pronounced discontinuity at that level and interface. For this purpose it has been suggested to use a probe which is comprised of two electrically insulated electrodes i.e. they are insulated from each other and are made of a material which is resistive to temperature to considerable extent. The electrodes, moreover, are covered and protected by a steel cap in order to prevent slag depositing on the electrodes proper as they are inserted into the bath. A constant DC voltge is applied to these electrodes by means of a flexible cable.

Earlier, the probe has been placed on a lance or rod and is now lowered into the metal bath by means of an appropriate transport device. The cap will melt in the steel and a DC current is now flowing between the electrodes, both being immersed in the bath and they are electrically interconnected by means of the liquid steel. The electric current flows in addition through a particular electrical resistance and a particular voltage drop can be taken from across that resistance, the voltage drop being indicative of the current that flows between the two electrodes.

As the lance is moved up the electrodes will also traverse the slag layer and the interface between slag and steel. As the electrodes traverse the interface the electric conditions and particularly the resistance of the current path between the two electrode changes drastically. That change reflects in a change in the voltage drop across the measuring resistor, and the voltage drop can be used to actuate an electronic threshold switch. The threshold switch includes a comparator whose response level is adjustable by means of applying a variable and adjustable reference voltage to one input of the comparator, the other input receives the measuring voltage. As soon as the threshold so adjusted is traversed, an indication is provided. The transport device lowering and lifting the lance may be constructed so that a running indication is provided as to the vertical level change of the two electrodes. The response of the comparator as described is then referenced against that particular indication which is deemed to indicate the level of the steel bath and its surface.

It was found, however, that the method explained above, may experience a variety of interferences modifying the current through the electrodes and, therefore, the voltage across the measuring resistor and these variations may in effect shift the particular response of the comparator which means that the measuring result is subject to an unforeseeable error. For reasons of interference in the external circuitry a two conductor system is used and the current through the steel is limited by the resistance of the cable and by the measuring resistance. Thus, the measuring result depends to some extent upon the length of the cable; in practice, the cable leading to the measuring electrodes maybe 50 meters long or more. Occasionally, in particular in the case of repairs, the length may be changed, also the transition resistances in the circuit including the transition resistance to and from the electrodes influence the current further. Finally, cable and electrodes may vary in temperature and that in turn may also result in a change in current. It can thus be seen that the known method now seemingly advantageous in principal, is prone to a number of interferences resulting in erroneous readings.

DESCRIPTION OF THE INVENTION

It is an object of the present invention to avoid the defiencies outlined above and to reduce interference in the measuring of the level of the surface of molten metal in a metallurgical vessel as interfacing with a slag layer.

It is a particular object of the present invention to provide a new and improved apparatus for ascertaining the surface level of liquid metal in a metallurgical vessel the metal interfacing with a slag layer and the apparatus is to include a two electrode probe interconnected externally in an electric circit that includes a voltage source preferably a constant voltage source; further including a winch or the like for lowering the probe into the vessel and raising and lifting the probe therefrom.

In accordance with the preferred embodiment of the present invention it is suggested to improve the apparatus in accordance with the particular object by providing a measuring surface that is connected to the probe to derive therefrom a voltage which is resentative of the current flow between the electrode; this measuring circuit may simply be a series resistor connected to one of the electrodes. An analog storage device has an input connected to the measuring circuit to receive the measuring voltage and further having an output which tracks the input normally there being however a switch for interrupting the tracking operation particularly during lifting of the probe so that subsequently the output equals a value of the input for the storage device just prior to the interruption, which is to represent the current flow between the electrodes as interconnected by the liquid metal in the vessel; a differential amplifier is connected to receive the measuring voltage directly as well as the output of the analog storage device and provides an output indicative of the difference; that output is connected to a threshold circuit which will respond if the difference voltage and output of the differential amplifier exceeds an adjustable value. A counter is provided which tracks the lowering and/or lifting of the probe and the operation of the counter is controlled when that particular threshold level has been reached; for example, the counter may count in the forward direction while the probe is lowered and reverses as the probe is lifted again, but counting is halted when the threshold level is reached in which case the count state represents the distance of the level the probe had at the instant of halting which occurs when the slag-metal is traversed by the electrodes, from a zero level from which the probe was lowered to begin with. It can thus be seen that the inventive device creates its own reference conditions based on the resistance offered by the steel to the probe. This reference condition is established when the probe is clearly spaced from the slag-liquid metal interface.

DESCRIPTION OF THE DRAWINGS

While the specification concludes with claims, particularly pointing out and distinctly claiming the subject matter which is regarded as the invention, it is believed that the invention, the objects and features of the invention, and further objects, featurers and advantages thereof, will be better understood from the following description taken in connection with the accompanying drawings, in which:

The FIGURE illustrates somewhat schematically an example of the preferred embodiment of the present invention in order to practice a best mode thereof.

Proceeding now to the detailed description of the drawings, the FIGURE illustrates somewhat schematically a converter vessel 17 which is partially filled with steel as indicated by reference numeral 10. Also, as schematically indicated the liquid steel 10 is covered by a layer of slag 11 and reference numeral 12 refers to the steel-slag interface being the surface level of the steel bath proper. In order to ascertain the particular location of the surface level 12 a probe 1 is lowered into the vessel, the probe being shown of course in an exaggerated scale as far as the vessel 17 is concerned.

The probe 1 includes two electrodes 13 and a sheet metal cap 14. As the probe is lowered into the converter vessel, the cap 14 melts and exposes the two electrodes 13 to the liquidous content of the converter. The electrodes are connected to conductors 15 which together establish a cable, the cable being included inside a lance which is not shown. However, the enclosure 1 can be interpreted as schematically representing the probe proper and a lance. The two conductors 15 are connected externally to a constant voltage source 16 which may be a constant voltage AC-to-DC converter with an AC input being connected to the mains. One of the conductors includes a series resistor 2, being the measuring resistor of the device.

Before describing the operation of the device, the circuit which is connected to the resistor 2 will be described. One line, 21 serves as reference line and maybe grounded but floating potential is well within the realm of the inventive system. The line 22 has two branches, one leads to an input of a differential amplifier 4, the other branch leads to an analog signal store 3 which may be of the sample-and-hold type. The sampling is carried out through opening of the switch 7; as long as the switch 7 is closed the output of the analog store 3 tracks its input and its output is connected to the second input of the differential amplifier 4. Therefore, as long as the switch 7 is closed both inputs for the differential amplifier 4 agree, whatever the value, and the output of the amplifier is necessarily zero. As switch 7 opens, the most recent input for circuit 3 is held and continues to be applied to the one input of the differential amplifier 4. The output of the amplifier 4 now represents the difference between the measuring signal in line 22 and the held reference which is in effect an earlier measuring signal.

The ouput of the differential amplifier is connected to a threshold switch 5 receiving as a reference input a voltage being adjusted by means of a potentiometer 9. The amplified output of the threshold device 5 is fed to a counter 6, for example, as a disabling signal for inhibiting further counting of clock pulses. These clock pulses may be derived from a winch motor and control 8 circuit by means of which probe 1 is lowered and raised from the steel bath and the interior of the converter whereby in particular the constraint may exist that the counter counts, say, in the forward direction when the winch lowers the probe 1 into the steel bath and counts in the reverse when the probe 1 is raised.

The inventive system functions as follows: Initially, the device 8 lowers the probe 1 from a particular position which is fixed with reference to the vessel 17 and which can be regarded as a zero point for the now ensuing level measurement. The counter 6 counts in forward direction which counting is unimpeded by any of the other elements in the illustrated circuit. As soon as the probe 1 hits the molten material cap 14 will melt and a current will flow. The resistor 2 produces a voltage drop and that voltage drop is applied to the analog store 3 and to the differential amplifier 4. Since at this point switch 7 is closed no output is produced by the differential amplifier 4 because its two inputs agree therefore, the counting operation is not in any manner interrupted by this response of the probe and the immediate circuitry connected to it.

The lowering of the probe by the winch is stopped in a particular level which is chosen to be with certainty in the interior of the steel bath 10, well below the slag level. The reversal of the winch is used as a command to open the switch 7. This means that the last measuring result prior to winch reversal is stored and remains stored in the analog store 3. This particularly sampled measuring result is produced by current flow through the steel bath resulting in a particular voltage drop across the resistor 2. The particular voltage now stored represents reference conditions in the steel converter as they presently exist. These conditions are established, for example, by the distance the electrodes have from each other; these conditions may be modified by slag particles or any other unusual but indepictible condition at one or both electrodes. Also, the level of the current through the probe and the resistor 2 depends to some extent on the length of the cable, the prevailing temperature etc. In other words, the particular current flow is not necessarily the same for different measuring runs.

Now the probe 1 is slowing lifted from the converter resulting in countdown pulses from unit 8 to decrement the content of counter 6. The current flow through the electrodes, the conductors and the resistor 2 will at first not vary much if at all as long as the electrodes are electrically interconnected by liquid steel, but as soon as the electrodes, particularly the tips thereof, reach the interface 12 the effective resistance of the current path between the electrodes changes and the now existing input signal as applied to the signal input of comparator 4 differs from the stored signal. Previously, minor differences, in a small range, may have existed, but they did not cause the threshold device 5 to respond. Now as the electrodes are interconnected by the liquid slag the measured difference in signal level is drastic and the threshold device 5 responds and stops the counter 6. The reference value for the threshold device adjusted by means of the resistor or potentiameter 9, has been previously ascertained, for example, imperically. However, it can readily be seen that its particular value is to considerable extent independent from any variations in the measuring system, the cable length, the steel consistency, any slag deposites on the electrodes, the temperature etc. The resistance change as detected is between liquid steel and liquid slag and remains substantially independent from these other parameters and is thus exclusively reflected in the adjustment of the resistor 9.

It was found that exact measurements can be ascertained if the withdrawal speed of the lance and probe is in the order of 10 to 40 centimeters per second, moreover, it was found that the inventive system extablishes an accuracy in the determination of the steel level and interface 12 which is better than 1 centimeter. The liquid level is of course indicated directly as a particular state of the counter 6 when the counter was halted. Each count state and each counting unit represents a particular measuring unit and length increment such as a millimeter, half a centimeter or the like. The winch state terms indicates, in terms of that unit, the distance of the level when the probe traversed the slag level from the zero point of lowering the probe in the first place.

It should be realized that certain modifications are within the scope of the invention; this includes in particular the operation of the counter. It is conceivable that the operation is reversed and that the counter is held in the zero state until the particular threshold level is reached indicative of traversal of the slag-metal interface whereupon the response of the threshold circuit removes the inhibition from the counter which begins to count. Counting continues until the winch has withdrawn the probe up to a particular, fixed level and the depth of the interface 12 is a distance with reference to that particular level of halting the winch and probe. In that particular case one does not need a forward and reverse counter because counting is provided for in one particular phase only namely during the lifting of the probe out of the steel bath.

The invention is not limited to the embodiments described above, but all changes and modifications thereof, not constituting departures from the spirit and scope of the invention, are intended to be included.

We claim:

1. Apparatus for ascertaining the surface level of the liquid metal in a metallurgical vessel and interfacing with a slag layer, the apparatus including a two-electrode probe interconnected externally in an electric circuit that includes a voltage source, there being means for lowering the probe, including the two electrodes, into the vessel and raising and lifting the probe again, the improvement comprising:

circuit means connected to the probe to derive therefrom a voltage being representative of any current flow between the electrodes;

an analog storage device having an input connected to receive said voltage and having an output tracking the input, and including switch means for selectively enabling and interrupting the tracking;

means responsive to lifting of the probe and connected for causing said interrupting so that the output of the analog storage device equals a value of the input prior to the interrupting, representing a current flow between the electrodes as interconnected by the liquid metal in the vessel;

a differential amplifier having an input connected to receive said voltage as provided by the circuit means and having a second input connected to receive said output of said analog storage device;

a threshold circuit connected to receive an output of the amplifier and having an adjustable circuit for adjustment of a threshold level; and a counter connected and operated for counting path increments for, thereby, tracking the lowering and/or lifting of the probe, further being connected for changing as between counting and not counting in response to the output of the threshold circuit then indicating that the output of the differential amplifier has exceeded the threshold level as adjusted in the threshold circuit.

2. Apparatus as in claim 1, including means for operating the switching means in response to reversing of the probe from lowering to lifting.

3. Apparatus as in claim 1 or 2, the counter being a forward and reverse counter and further connected for being halted in response to said threshold output.

* * * * *